(12) United States Patent
Catling et al.

(10) Patent No.: US 12,032,900 B2
(45) Date of Patent: Jul. 9, 2024

(54) AIDING DATA ENTRY FIELD

(71) Applicant: International Business Machines Corporation, Armonk, NY (US)

(72) Inventors: Samantha Catling, Winchester (GB); Ashleigh Shona Denholm, Southampton (GB); Emma Jane Dawson, Eastleigh (GB); Jack Peter Wadsted, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/490,297

(22) Filed: Sep. 30, 2021

(65) Prior Publication Data

US 2023/0105018 A1 Apr. 6, 2023

(51) Int. Cl.
*G06F 40/174* (2020.01)
*G06F 16/245* (2019.01)
*G06F 40/20* (2020.01)

(52) U.S. Cl.
CPC .......... *G06F 40/174* (2020.01); *G06F 16/245* (2019.01); *G06F 40/20* (2020.01)

(58) Field of Classification Search
None
See application file for complete search history.

(56) References Cited

U.S. PATENT DOCUMENTS

| | | | | |
|---|---|---|---|---|
| 7,660,779 B2 * | 2/2010 | Goodman | ............. | G06F 40/174 |
| | | | | 715/224 |
| 9,696,904 B1 * | 7/2017 | Mohapatra | .......... | G06F 3/04886 |
| 10,635,748 B2 * | 4/2020 | Liu | ......... | G06F 40/295 |
| 10,671,805 B2 * | 6/2020 | Pennington | ............ | G06Q 10/10 |
| 10,796,084 B2 * | 10/2020 | Wang | ...................... | G06F 40/40 |
| 11,340,871 B1 * | 5/2022 | Masis | ....... | G06F 8/10 |
| 2004/0181749 A1 | 9/2004 | Chellapilla | | |
| 2011/0219299 A1 * | 9/2011 | Scalosub | ............... | G06F 40/274 |
| | | | | 715/261 |
| 2012/0166929 A1 * | 6/2012 | Henderson | ............ | G06F 40/174 |
| | | | | 715/224 |
| 2015/0161291 A1 * | 6/2015 | Gur | ................... | G06F 16/90332 |
| | | | | 707/722 |
| 2016/0217119 A1 * | 7/2016 | Dakin | ................... | G06F 40/274 |
| 2017/0046622 A1 * | 2/2017 | Gaither | ................. | G06F 40/247 |
| 2017/0075873 A1 * | 3/2017 | Shetty | ................... | G06F 40/174 |

(Continued)

OTHER PUBLICATIONS

"Automatic SMS Verification with the SMS Retriever API", Last updated Oct. 31, 2017, 2 pages, <https://developers.google.com/identity/sms-retriever/overview>.

(Continued)

*Primary Examiner* — Howard Cortes
(74) *Attorney, Agent, or Firm* — Kristofer L. Haggerty

(57) ABSTRACT

Concepts for populating a data entry field with data are proposed. Specifically, by identifying a context of a data entry field of a target application and analyzing a dataset from source applications based on the identified context, the data entry field may be automatically populated with relevant data. In this way, data from source applications may be transferred to data entry fields of a target application without the need for a user to memorize (or otherwise manually transfer) the data. Accordingly, this decreases time consumed and frustration of the user, while reducing the rate of copying errors.

18 Claims, 5 Drawing Sheets

(56) References Cited

U.S. PATENT DOCUMENTS

| | | | | |
|---|---|---|---|---|
| 2017/0091320 A1* | 3/2017 | Psota | ................... | G06F 16/313 |
| 2017/0116385 A1* | 4/2017 | Lauderdale | ............ | G16H 80/00 |
| 2017/0139575 A1* | 5/2017 | Chen | ................... | G06F 3/04842 |
| 2017/0192949 A1* | 7/2017 | Gaither | ................ | G06F 40/174 |
| 2017/0249059 A1* | 8/2017 | Houseworth | ....... | G06F 3/04883 |
| 2017/0357627 A1* | 12/2017 | Peterson | ............... | G06F 3/0488 |
| 2018/0039610 A1* | 2/2018 | Litvak | ................... | G06F 40/274 |
| 2019/0311563 A1* | 10/2019 | O'Neill | ................... | G06F 16/93 |
| 2021/0027013 A1* | 1/2021 | Leme | ................ | G06F 16/9535 |

OTHER PUBLICATIONS

"Get Started—Braintree Developer Documentation", Overview, downloaded from the Internet on Sep. 9, 2021, Braintree Direct, 2 pages, <https://developer.paypal.com/braintree/docs/start/overview>.

"Google Lens—Search What You See", downloaded from the Internet on Sep. 9, 2021, 6 pages, <https://lens.google/>.

"Multi-Window Support | Android Developers", downloaded from the Internet on Sep. 9, 2021, 20 pages, <https://developer.android.com/guide/topics/ui/multi-window>.

"The Most Accurate Way to Autofill Forms on the Web", Get Dashlane, provided by Searcher in Search Report dated Feb. 25, 2021, 4 pages, <https://www.dashlane.com/features/autofill>.

\* cited by examiner

AIDING DATA ENTRY FIELD

BACKGROUND

The present invention relates generally to the field of aiding data entry, and more particularly to populating data entry fields with data.

Users are often required to complete digital forms with data captured from the physical world. Often, the user captures the required data by taking a photograph, or writing the information in a notes application on a digital device. If the form is to be completed on the same digital device, then the process of transferring the data to the digital form is typically a time consuming and frustrating exercise.

By way of example, when taking a meter reading a user may take a photo by using a camera application on a mobile device. When inputting said meter reading into a digital website form on the same mobile device, it may be necessary to either remember the information as they transition between the photo and the form, or write the information manually away from the device. Not only is this inefficient in terms of time, but also can lead to copying errors.

In other words, when filing in a digital form a user may need to access information from a number of different sources on a digital device. Typically, this means that they must flick between applications to access information, quickly memorize the information, and then return to the digital form to provide the information. Such information may include a phone number, a meter reading, a bank account number, a sort code, or an address. Indeed, in many cases the information is too long to memorize in one attempt, requiring the user to spend yet more time switching between applications.

SUMMARY

The present invention seeks to provide a computer-implement method for populating a data entry field with data.

The present invention further seeks to provide a computer program product for populating a data entry field with data, the computer program product comprising a computer readable storage medium having program instructions embodied therewith, the program instructions executable by a processing unit to cause the processing unit to perform a method for populating a data entry field with data.

The present invention also seeks to provide a processing system comprising at least one processor and a computer program product for populating a data entry field with data, wherein the at least one processor is adapted to execute the computer program code of said computer program product.

The present invention additionally seeks to provide a system for populating a data entry field with data.

According to an aspect of the present invention, there is provided a computer-implement method for populating a data entry field with data. The method comprises identifying a data entry field of a target application of a computing device, identifying a context associated with the data entry field of the target application, obtaining a dataset from one or more source applications of the computing device, analyzing the dataset based on the identified data entry field and context to identify data for the data entry field, and providing the identified data to the target application for populating the data entry field.

According to another aspect of the invention, there is provided a computer program product for populating a data entry field with data, the computer program product comprising a computer readable storage medium having program instructions embodied therewith, the program instructions executable by a processing unit to cause the processing unit to perform a method. The method comprises identifying a data entry field of a target application of a computing device, identifying a context associated with the data entry field of the target application, obtaining a dataset from one or more source applications of the computing device, analyzing the dataset based on the identified data entry field and context to identify data for the data entry field, and providing the identified data to the target application for populating the data entry field.

According to yet another aspect of the invention, there is provided a system for populating a data entry field with data. The system comprises a processor arrangement configured to identify a data entry field of a target application of a computing device and to identify a context associated with the data entry field of the target application, and a broker component configured to obtain a dataset from one or more source applications of the computing device, analyze the dataset based on the identified data entry field and context to identify data for the data entry field, and to provide the identified data to the target application for populating the data entry field.

Concepts are proposed for populating a data entry field (e.g. of a digital form) with data. In particular, by ascertaining information about the context of the data entry field of a target application, and analyzing a dataset from source applications in consideration of the context, the data entry field may be automatically populated with relevant data. In this way, copying errors may be avoided.

Further, as the data set may be obtained from a number of different source applications without the need for the user to transition between the applications, user time may be saved. Indeed, the source applications may be any application which the user utilities to capture information, such as a messaging application, a photo gallery application, a note application, or the like. Additionally, this process may be performed in the background of the computing device, such that user intervention is not necessary.

An exemplary embodiment of a method may comprise identifying a data entry field of a target application of a computing device, identifying a context associated with the data entry field of the target application, obtaining a dataset from one or more source applications of the computing device, analyzing the dataset based on the identified data entry field and context to identify data for the data entry field, and providing the identified data to the target application for populating the data entry field.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION

Figure 1:
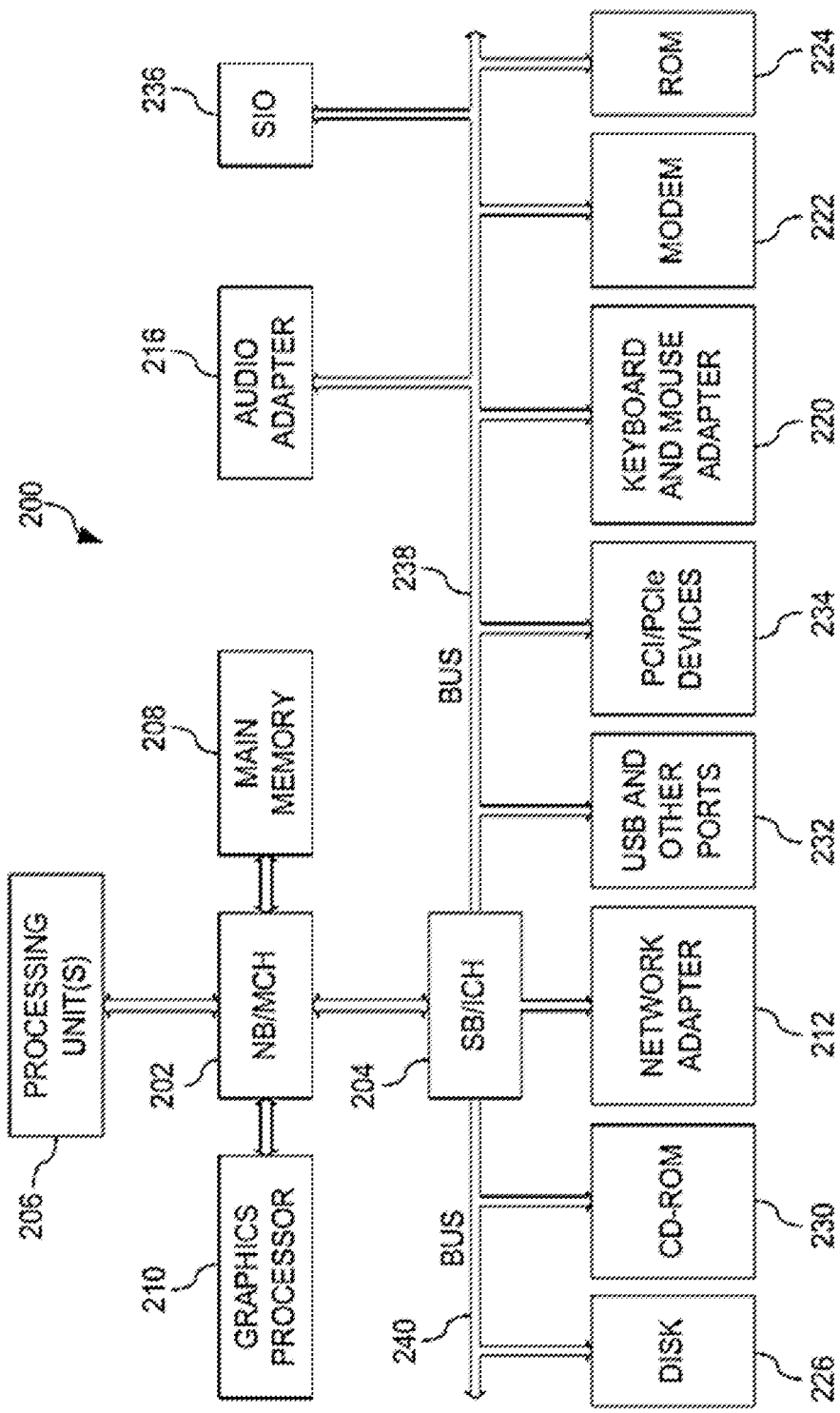
FIG. 1 is a block diagram of an example system in which aspects of the illustrative embodiments may be implemented.

The present invention relates generally to the field of aiding data entry, and more particularly to populating data entry fields with data. The invention will be described with reference to the Figures.

It should be understood that the detailed description and specific examples, while indicating exemplary embodiments of the apparatus, systems and methods are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. If the term "adapted to" is used in the claims or description, it is noted the term "adapted to" is intended to be equivalent to the term "configured to".

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Implementations in accordance with the present disclosure relate to various techniques, methods, schemes and/or solutions pertaining to populating a data entry field with data. In particular, by obtaining a dataset from one or more source applications, and analyzing the data entry field with its associated context and the dataset, data for population of the data entry field may be identified. Put another way, the data entry field may be automatically populated with data from source applications based on a context of the data entry field. This may reduce an amount of input required from a user, thus reducing time taken and errors in filling a digital form.

Embodiments of the proposed invention provide a data entry field populated with data. This is achieved by identifying a data entry field of a target application of a computing device, identifying a context associated with the data entry field of the target application, obtaining a dataset from one or more source applications of the computing device, analyzing the dataset based on the identified data entry field and context to identify data for the data entry field, and providing the identified data to the target application for populating the data entry field. Accordingly, a data entry field may be filled with (relevant) data in an automatic manner. Thus, little to no user input is required to fill the data entry field. In this way, the speed at which a digital form containing the data entry field may be increased, while also reducing the rate of copying errors.

It has been realized that by automatically identifying a data entry field along with its associated context, it is possible to identify relevant data from source applications on a computing device, such that a user may not have to switch between applications to obtain information for data entry field population. By way of example, this may be useful when a user needs to enter a postcode into a map application, and has the postcode stored in a messaging application or note application. Accordingly, the postcode may be correctly lifted from the source application, and used to populate the search field of a target application with no copying errors, and without the need for the user to search for and memorize the postcode.

In this way, the invention may be able to intelligently recognize when a data item from a source application (e.g. a photograph) has similar/matching numbers or characters to a data entry field (e.g. textbox) on a target application. Accordingly, the invention may offer the user an option to autofill this data item in to the data entry field.

In other words, the invention may allow a computational device (e.g. mobile phone) to extract data from a source application (e.g. a photo gallery), to be used in a digital form of the target application (e.g. web browser) requiring user input. When a target application is opened by the user, embodiments of the invention trawl the data entry fields, and identify the context of the data entry field input. The recent history of the source application may then be reviewed, and the dataset may be extracted using known technology (e.g. optical character recognition). With a context of the data entry field identified, and a dataset provided, embodiments of the invention may search for matches or similarities between the data and the data entry field and its associated context. Data of the dataset may then be recommended for population of the data entry field.

In regards to the meaning behind the terminology of context (of both the data entry field, and material of source applications), the computer program may determine the context through: metadata within the applications; HTML code that can be pulled from the application; formatting of the data within the applications; the input type of the field; and the use of OCR to detect relevant symbols (in the case of imagery).

An underlying mechanism of embodiments of the invention may be a broker component. This handles the reception of dataset, the identification of the data entry field (and its context identification), and the transmission of data to a target application for population of the data entry field. Any application may identify itself as either a source application or a target application, or both. In some cases, the source applications may inform the broker that it has new information to process. The information may be processed to extract data, ready to be provided to target applications that request it. Subsequently, the target application may request data that is stored related to a context associated with the data entry field. This may occur when the data entry field receives a focus (e.g. clicked on or hovered over).

In some embodiments, analyzing the dataset based on the identified data entry field and context comprises, for each data item of the dataset, comparing the data item with an input parameter of the data entry field and the context to determine a matching value for the data item, and identifying a data item from dataset based on the determined matching values for the data items.

In other words, by determining a matching value for each data item of the data set, a data item with the most desirable matching value may be identified. By basing the matching value on a comparison between the data item and an input parameter (of the data entry field and context), relevant data items may be indicated by the matching value. Accordingly, data items which are more appropriate for population of the data entry field may be identified, and less appropriate data items ignored.

In further embodiments, the matching value for a data item comprises a confidence value representing a measure of confidence in the data item matching the input parameter of the data entry field.

Accordingly, if a confidence value is calculated, then an associated confidence that the data item is appropriate for populating the data entry field may be determined. Thus, any data items which fall below a predetermined threshold value may not be considered for entry into the data entry field. Data items which exceed a predetermined threshold value may be used to populate the data entry field, or may be recommended to a user for acceptance into the data entry field.

In some other embodiments, the input parameter is based on at least one of a date-time stamp representative of when the data item was obtained by the source application, a previous usage rate of the data item for population of data entry fields, and a regular expression value.

As the input parameters may be any of the above, a more accurate matching value may be determined. The input parameter may include a time stamp, meaning that data item acquired by source applications more than a certain amount of time ago may be disregarded. This may be particularly helpful, for example, when the data item is a postcode to be populated in a search field of a map application. Many postcodes may be available in source applications, but it is likely that the most recent postcode is the most appropriate. Further, a usage rate may indicate a data item which is often used (such as the users account number and sort code). In addition, a regular expression value indicates the format of data for entry. By way of example, a phone number. Thus, if the format of the data item matches the regular expression value, it may be more appropriate for population than one which only partially matches the format.

In some embodiments, identifying a data entry field comprises detecting a notification from the target application, the notification indicating the presence of a data entry field for population.

It may be the case that the target application directly requests data for population of the data entry field. In this case, the identification may be performed by receiving this information from the target application.

In further embodiments, identifying a data entry field comprises processing communications from the target application to detect the presence of an identifier of a data entry field.

In alternative cases, it may be necessary to process communications from the target application in order to identify all data entry fields. While this may require more processing than simply waiting for the target application to request data, it also anticipates possible data entry fields for populations, not requiring the developer of the target application to include data requests.

In yet further embodiments, identifying a context associated with the data entry field comprises processing the communications from the target application using natural language processing (NLP). NLP is a subfield of linguistics, computer science, and artificial intelligence for processing natural language data and determining the meaning of a word, sentence, or segment of natural language data.

It may not always be apparent what the context of the data entry field is. Thus, by utilizing NLP, evidence may be gathered as to the context of the data entry field. This may be particularly helpful when the data entry field is accompanied by a title, indicating the type of data required. Indeed, there is likely to be plenty of textual evidence as to the context of the data entry field, as a user will typically need to visually ascertain the information to be inserted. Furthermore, by utilizing NLP a more accurate assessment of the context of the data entry field may be achieved.

In some embodiments, obtaining a dataset comprises receiving a communication from a source application, processing the received communication using NLP to extract a data item, and adding the extracted data item to a collection of data items so as generate a dataset.

It may be the case that source applications contain textual information which can be extracted and added to the dataset. For example, when a user enters information into a note application on their computational device, the source application may communicate the information as a data item. More particularly, if a user writes a phone number into a note application, this may be easily identified as a data item using NLP.

In other embodiments, obtaining a dataset comprises communicating a request to a source application, receiving, from the source application, a response to the request, wherein the response comprises data from the source application, processing the data from the source application with a data extraction algorithm to extract a data item, and adding the extracted data item to a collection of data items so as generate a dataset.

In this way, a dataset may be obtained from a variety of source applications. Indeed, in some cases specific source applications may be queried which are appropriate considering the data entry field.

Moreover, processing data from the source application may be necessary to obtain data items. For example, if the data from the source application is a picture, then a data extraction algorithm is necessary to obtain the data in a form which may be used for population of the data entry field. Indeed, in this way the dataset may be expanded, meaning that a more appropriate and relevant data item may be used to populate the data entry field.

In this case, the data extraction algorithm may comprise at least one of an optical character recognition algorithm, an image recognition algorithm, a natural language processing algorithm, and a data format checking algorithm. Optical character recognition algorithms allow computers to analyze printed or handwritten documents automatically and prepare text data into editable formats for computers to efficient process them. Image recognition algorithms are used to identify and detect various vital components or desired parts and features of an image. Data format checking is the process of ensuring the data is formatted.

In this way, the data extraction algorithm may obtain all useful data items for population of the data entry field. Thus, a more appropriate and relevant data item may be identified for population of the data entry field.

Turning now to FIG. 1, a block diagram of an example system 200 in which aspects of the illustrative embodiments may be implemented is depicted. The system 200 is an example of a computer, such as client or user device in a distributed processing system, in which computer usable code or instructions implementing the processes for illustrative embodiments of the present invention may be located. For instance, the system 200 may be configured to implement a processor arrangement and a broker component according to an embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. In an embodiment, system 200 comprises one or more processing units. The graphics processor 210 may be connected to the NB/MCH 202 through an accelerated graphics port (AGP).

In the depicted example, a network adapter 212 (e.g., a local area network (LAN) adapter) connects to SB/ICH 204. An audio adapter 216, a keyboard and a mouse adapter 220, a modem 222, a read only memory (ROM) 224, a disk 226 (e.g., a hard disk drive (HDD), a CD-ROM 230 (e.g., a CD-ROM drive), a universal serial bus (USB) port and other communication ports 232, and PCI/PCIe devices 234 connect to the SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The disk 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 1. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be an electronic server or computer system (e.g., IBM® eServer™ System P® computer system, running the Advanced Interactive Executive (AIX®) operating system or the LINUX® operating system). The system 200 may be a symmetric multiprocessor (SMP) system including a plurality of processors in processing unit 206. Alternatively, a single processor system may be employed.

Instructions for the operating system, the programming system, and applications or programs are located on storage devices, such as disk 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices.

A bus system, such as bus 238 or bus 240 as shown in FIG. 1, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 1, may include one or more devices used to transmit and receive data. A memory may be, for example, main memory 208, ROM 224, or a cache such as found in NB/MCH 202 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 2:
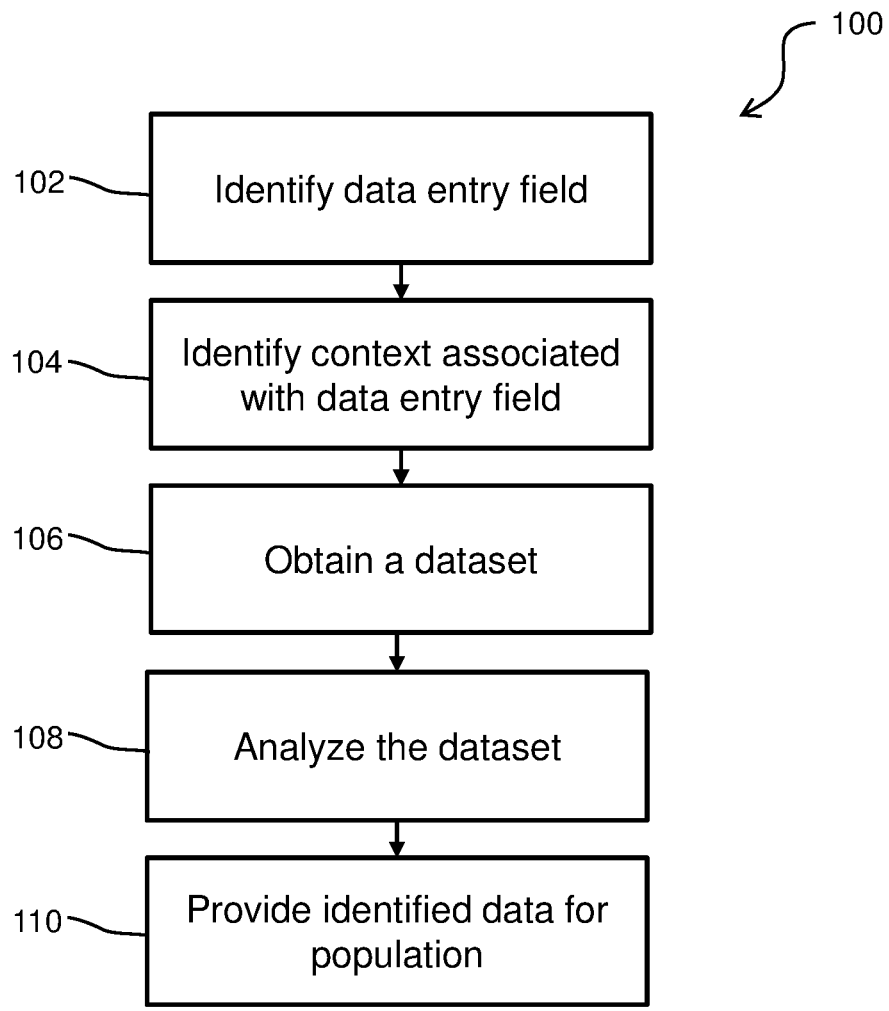
FIG. 2 is a flow diagram of a method for populating a data entry field with data according to an exemplary embodiment.

FIG. 2 is a flow diagram 100 of a method for populating a data entry field with data according to an exemplary embodiment is depicted.

At step 102, a data entry field of a target application of a computing device is identified. The target application may be any application where information may be input by a user. Some typical examples include: a mobile banking application, a map application, a web browser application, a utility company application, and a contacts application. The data entry field may be any field where data is to be entered, such as a textbox, a drop down menu, and a check box.

In some cases, a notification from a target application may be detected that indicates the presence of a data entry field for population. In other words, the target application may actively request population of the data entry field.

Alternatively, communications from the target application may be processed to detect the presence of an identifier of a data entry field. Indeed, it may be the case that the developer of the target application does not implement requests for data entry. Therefore, it may be necessary to actively process communications from the target application to detect the presence of a data entry field.

Further, it may be the case that both of the above methods are utilized, with the target application actively requesting data entry, while the communications are also monitored for other potential data entry. In this way, all opportunities for automatic population of data entry fields will be detected.

At step 104, a context associated with the data entry field of the target application may be identified. Contextual clues may be determined from a number of different sources. For example, the type of application of the data entry field, textual information associated with the data entry field, a format of the data entry field, a type of data entry field, may all be considered.

Moreover, the identification of the context associated with the data entry field may be performed by processing the communications from the target application using NLP. This may be particularly advantageous when the data entry field is accompanied with a title. In such a case, the NLP may identify the title and ascertain a context of the data entry field from the title. Indeed, the title of the digital form which is being filled may also prove useful. Furthermore, it is often the case that data entry fields are accompanied by text indicating the format of the data to be input—another clue which may be utilized to identify a context of the data entry field.

Furthermore, the context of the data entry field may be identified by leveraging metadata within the target application, HTML code that can be pulled from the target application, formatting of the data within the target application, the input type of the field, and the use of OCR to detect relevant symbols within the target application. In this way, an accurate and precise context of the data entry field within the target application may be determined.

At step 106, a dataset is obtained from one or more source applications of the computing device. In this way, a dataset may be obtained from a large variety of applications of the computing device, pooling data from many sources to identify appropriate data for data entry field population.

In some embodiments, a communication from a source application may be received, which can be subsequently processed using NLP to extract a data item. In an embodiment, source applications may actively transmit information for the dataset when the user enters additional data. The NLP of the communication may be necessary in order to ascertain the data item in a standard format, such that population of the data entry field may be completed accurately. Finally, the extracted data item may be added to a collection of data items so as generate a dataset. Other data items of the dataset may be from other source applications, or from other communications of the source application.

In an embodiment, source applications may be requested to provide data for the dataset. In this case, the data from the source application may be processed with a data extraction algorithm to extract a data item. The extracted data item may be added to a collection of data items so as to generate a dataset. The data extraction algorithm comprises at least one of an optical character recognition algorithm, an image recognition algorithm, a natural language processing algorithm, and a data format checking algorithm. In this way, all possible data available in the source application may be obtained.

Indeed, both of the above methods may be used to obtain a dataset. As a general rule, the larger the dataset obtained, the higher the likelihood that the data item used to populate the data entry field is appropriate (relevant).

At step 108, the dataset is analyzed based on the identified data entry field and context to identify data for the data entry field. In other words, data of the dataset which is appropriate for the data entry field is determined based on the identified data entry field and context. Accordingly, data which is appropriate for population of the data entry field is recognized.

In an embodiment, a comparison may be performed between the data item with an input parameter of the data entry field and the context to determine a matching value for the data item, for each data item of the dataset. In this way, a matching value may be assigned for each data item in the dataset. In some embodiments, the matching value for a data item comprises a confidence value representing a measure of confidence in the data item matching the input parameter of the data entry field. As such, the matching value indicates how likely it is that the data item is appropriate for populating the data entry field.

In an embodiment, a data item from a dataset may be identified based on the determined matching values for the data items. For example, a high matching value may represent a high level of confidence that the data item matches the input parameter of the data entry field. Accordingly, it may be desirable to populate the data entry field with the identified data item.

The input parameter may be based on at least one of a date-time stamp representative of when the data item was obtained by the source application, a previous usage rate of the data item for population of data entry fields, and a regular expression value. However, the input parameter is not restricted to these parameters.

In the case that the input parameter is based upon a date-time stamp representative of when the data item was obtained by the source application, older data may be less likely to be used to populate the data entry field. Alternatively, very recent data may be much more likely to be used, as it is likely to be more appropriate. In addition, if the data item has been used many times for population, then it is likely to be used again.

At step 110, the identified data is provided to the target application for populating the data entry field. The identified data may only include one data item for population, and may automatically populate the data entry field. Alternatively, this may require a user to approve the identified data entry, by a selection.

As yet another alternative, a plurality of identified data may be provided, and the user may select from a range of options. This may prove particularly beneficial when, for example, the data items are all postcodes. The postcodes may be provided in an order prioritizing the most recently acquired by the one or more source applications.

Figure 3:
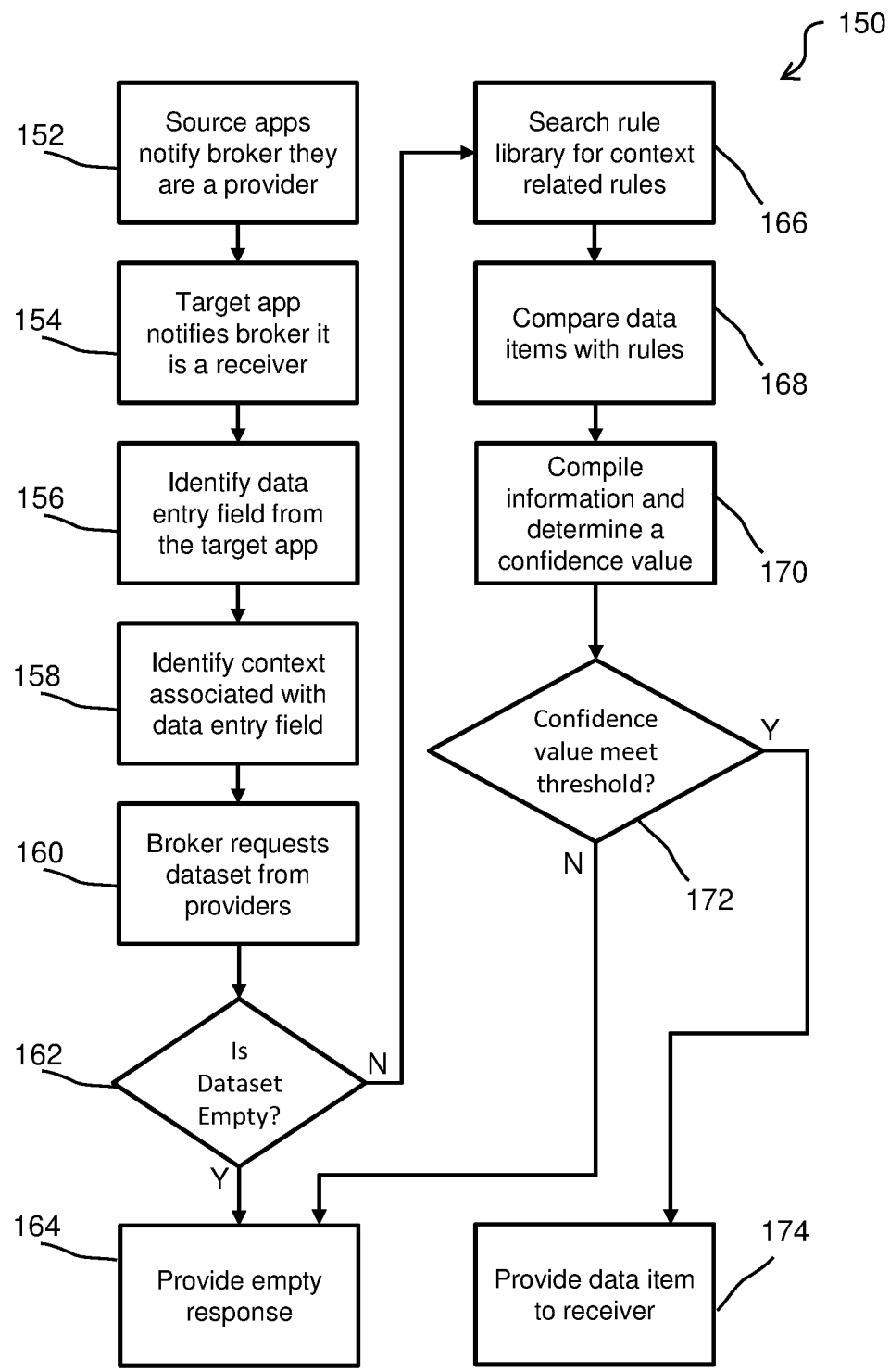
FIG. 3 is a flow diagram of method for populating a data entry field with data according to an another exemplary embodiment.

FIG. 3 is a flow diagram 150 of a method for populating a data entry field with data according to an exemplary embodiment is depicted. In particular, the method is described in relation to a broker which handles the flow of data between the source application(s) and target application.

At step 152, background (source) applications (e.g. a gallery app) may notify a broker that they are providers of data. In an embodiment, this is performed responsive to a user causing the operating system (OS) of the computational device starting up.

At step 154, a target application may notify the broker that it is a receiver of data. In an embodiment, this is performed responsive to the user opening up the target application.

At step 156, a data entry field of the application is identified. In an embodiment, this is performed using the method described in relation to step 102 of FIG. 2.

At step 158, a context associated with the data entry field is identified. For example, the context of the data entry field from the receiver may be an address, postcode, gas meter, bank card. In an embodiment, this is performed using the method described in relation to step 104 of FIG. 2.

At step 160, the broker requests a dataset from providers. The providers supply the broker with a dataset specific to each application. By way of example, a gallery app may provide all photos taken in the last 15 minutes. The data provided back to the broker may be determined by the developers of the provider (source) application, so the amount of time or type of data may vary. The broker may process the dataset that it has been supplied into text by performing optical character recognition and image recognition on images, or formatting checks on text (e.g. is 0778319403 a valid phone number), extracting the information, and storing it.

At step 162, it is determined whether the dataset is empty. If empty then the method moves onto step 164, in which the target application is not provided with data. If not empty, then the method moves onto step 166.

At step 166, the broker searches a rule library for rules that are related to the context of the data entry field. The rule library may have a store of hardcoded rules for different types of data. For example, regular expression (REGEX) of a postcode is 3×3 or 4×3 numbers, and a bank card is 16 numbers long.

At step 168, the broker compares the provided data of the dataset with the context data of the data entry field.

At step 170, the confidence level of the match may be ascertained. The better the data match, the higher a confidence level. The results may be sorted by a confidence level, and sent back to the target application as processed data, along with the relevant reference point (e.g. the picture that provided the match).

At step 172, it is determined whether the data meets a certain confidence threshold. If the data does not meet the confidence threshold, then the method proceeds to step 164, in which the target application is not provided with data. If data meets the confidence threshold, then the method proceeds to step 174, in which the target (receiver) application is provided with the data. The data sent to the target application may either populate a dropdown list, present the best option (highest confidence level), or another function as decided by the specific implementation. If the user provides data into the data entry field, the broker process may be discarded.

Figure 4:
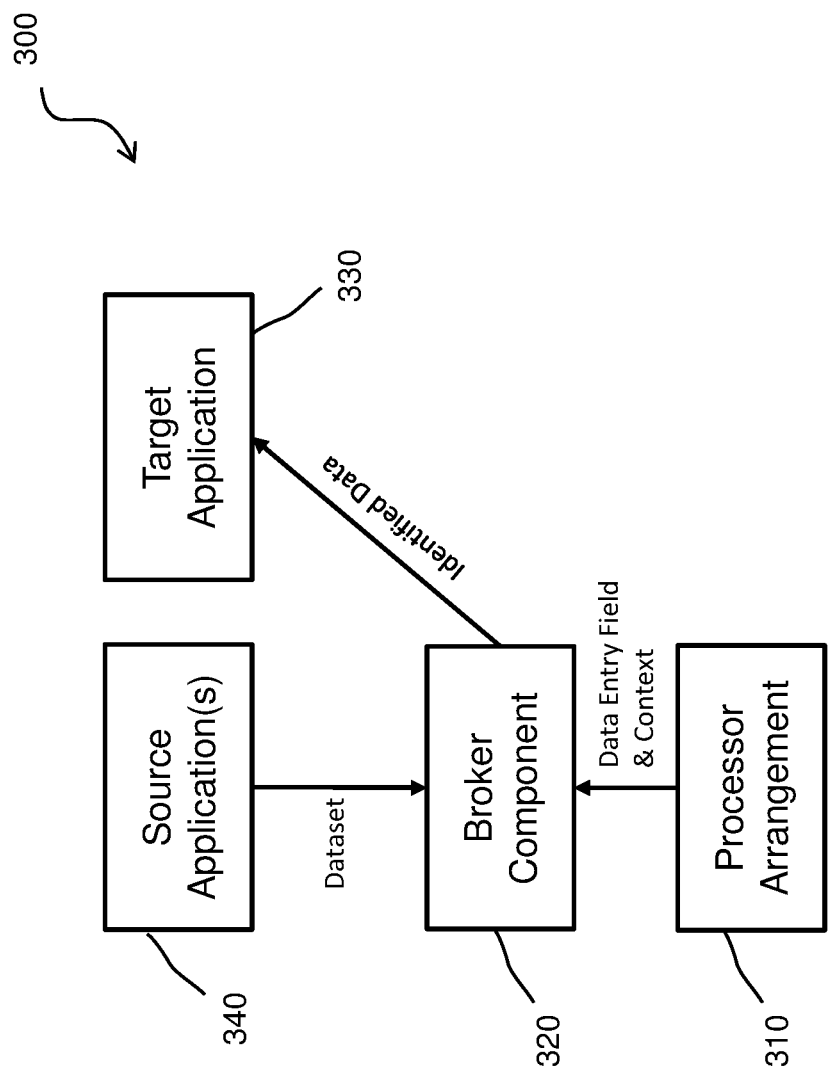
FIG. 4 is a block diagram of an exemplary embodiment of a system for populating a data entry field with data.

FIG. 4 depicts a simplified block diagram 300 of a system for populating a data entry field with data according to an exemplary embodiment. The system comprises a processor arrangement 310, a broker component 320, a target application 330 and one or more source applications 340.

Specifically, the processor arrangement 310 is configured to identify a data entry field of a target application 330 of a computing device, and to identify a context associated with the data entry field of the target application 330.

In an embodiment, the processor arrangement 310 may be configured to detect a notification from the target application 330, the notification indicating the presence of a data entry field for population. In an embodiment the processor arrangement 310 may be configured to process communications from the target application 330 to detect the presence of an identifier of a data entry field.

Moreover, the processor arrangement 310 may be configured to process the communications from the target application 330 using natural language processing, NLP.

The broker component 320 is configured to obtain a dataset from one or more source applications 340 of the computing device, analyze the dataset based on the identified data entry field and context to identify data for the data entry field, and to provide the identified data to the target application 330 for populating the data entry field.

In some embodiments, the broker component 320 is also configured to receive a communication from a source application 340, process the received communication using NLP to extract a data item, and add the extracted data item to a collection of data items so as generate a dataset.

In an embodiment, the broker component 320 may also be configured to communicate a request to a source application 340, receive, from the source application 340, a response to the request (wherein the response comprises data from the source application 340), process the data from the source application 340 with a data extraction algorithm to extract a data item, and add the extracted data item to a collection of data items so as generate a dataset.

Figure 5:
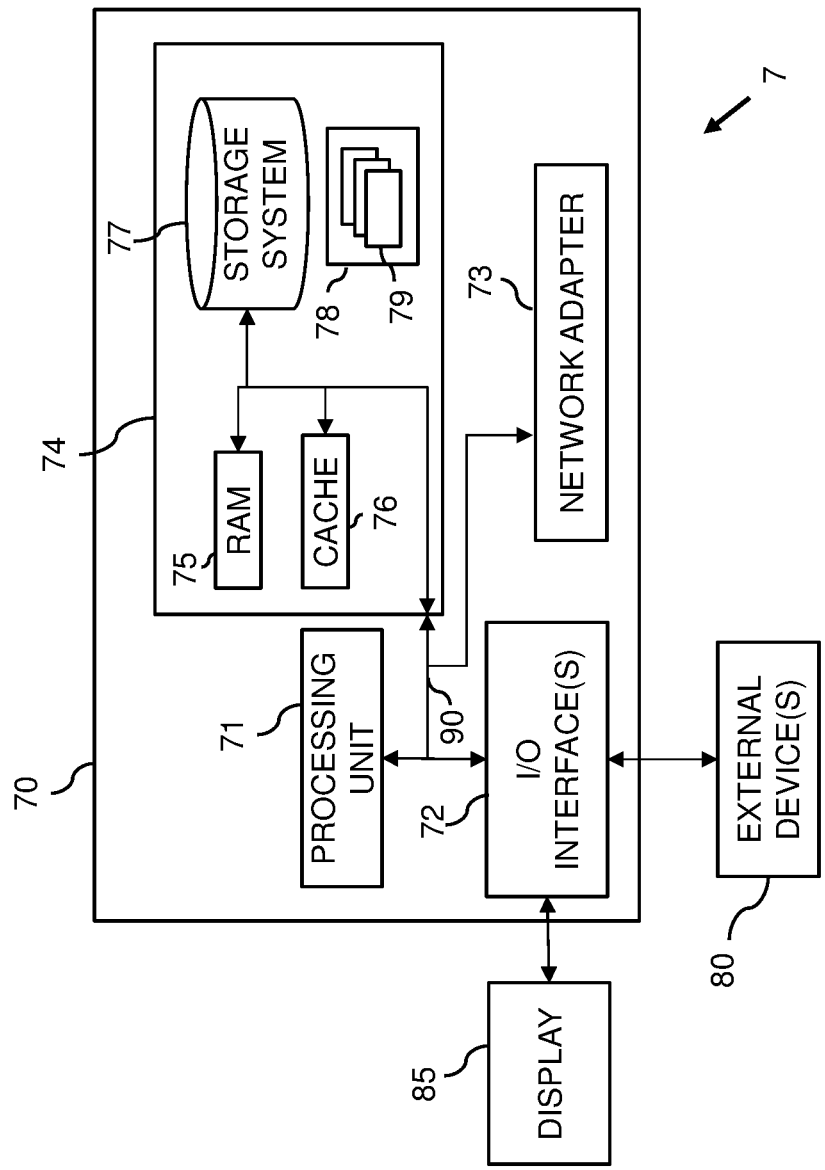
FIG. 5 is a simplified block diagram of a computer system on which the method for populating a data entry field with data may be executed.

By way of further example, as illustrated in FIG. 5, embodiments may comprise a computer system 70, which may form part of a networked system 7. For instance, a system for redacting an image to be displayed by a display device may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 and storage system 77 are computer readable storage media. In the depicted embodiment, system memory 74 can include computer system readable media in the form of volatile memory, such as random access memory (RAM) 75 and/or cache memory 76.

Computer system/server 70 may further include other removable/non-removable, volatile/non-volatile computer system storage media. In general, system memory 74 can include any suitable volatile or non-volatile computer readable storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform, a method for detecting a scene transition in video footage according to a proposed embodiment.

Program/utility 78, having a set (at least one) of program modules 79, may be stored in storage system 77, or more generally, any computer readable storage media, for execution by one or more respective computer processor(s) via one or more memories of system memory 74. Program modules 79 generally carry out the functions and/or methodologies of proposed embodiments for detecting a scene transition in video footage. System storage 77 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information. Media used by system storage 77 may also be removable. For example, a removable hard drive may be used for system storage 77. Other examples include optical and magnetic disks, thumb drives, and smart cards that are inserted into a drive for transfer onto another computer readable storage medium that is also part of system storage 77. Software and data used to practice embodiments of the present invention can be stored on such portable computer readable storage media and may be loaded onto storage system 77 via I/O interface(s) 72. I/O interface(s) 72 also can similarly connect to display 85. Display 85 provides a mechanism to display data to a user and may be, for example, a computer monitor.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The mere fact that certain measures are recited in mutually different dependent claims does not indicate that a combination of these measures cannot be used to advantage.

Any reference signs in the claims should not be construed as limiting the scope.

What is claimed is:

1. A computer-implement method for populating a data entry field with data, the method comprising:
    identifying a data entry field of a target application;
    identifying a context associated with the data entry field of the target application;
    obtaining a dataset from one or more source applications;
    analyzing the dataset based on the identified data entry field and the context associated with the data entry field to identify a plurality of data items for the data entry field;
    for each data item of the plurality of data items, comparing the data item with an input parameter of the data entry field and the context associated with the data entry field to determine a matching value and confidence value for the data item, wherein the input parameter is a usage rate of each data item;
    providing at least one data item of the plurality of data items to the target application for populating the data entry field based, at least in part, on the matching value for the data item; and
    prioritizing the at least one data item of the plurality of data items most recently acquired by the one or more source applications based on the time representative.

2. The computer-implement method of claim 1, wherein the confidence value represents a measure of confidence in the data item matching the input parameter and the context associated with of the data entry field.

3. The computer-implement method of claim 1, wherein the input parameter is further based on at least one of a time representative of when the data item was obtained by the one or more source applications and a regular expression value.

4. The computer-implement method of claim 1, wherein identifying a data entry field comprises:
    detecting a notification from the target application, the notification indicating the presence of a data entry field for population.

5. The computer-implement method of claim 1, wherein identifying a data entry field comprises:
    processing communications from the target application to detect the presence of an identifier of a data entry field.

6. The computer-implement method of claim 1, wherein comparing the data item with an input parameter of the data entry field and the context to determine the matching value for the data item further comprises:
    determining a most desirable matching value.

7. The computer-implement method of claim 1, wherein obtaining a dataset further comprises:
    receiving a communication from a source application;
    processing the received communication using NLP to extract a data item; and
    adding the extracted data item to a collection of data items so as generate a dataset.

8. The computer-implement method of claim 1, wherein obtaining a dataset further comprises:
    communicating a request to a source application;
    receiving, from the source application, a response to the request, wherein the response comprises data from the source application;
    processing the data from the source application with a data extraction algorithm to extract a data item; and
    adding the extracted data item to a collection of data items so as generate a dataset.

9. The computer-implement method of claim 8, wherein the data extraction algorithm comprises at least one of:
    an optical character recognition algorithm;
    an image recognition algorithm;
    a natural language processing algorithm; and
    a data format checking algorithm.

10. A computer program product for populating a data entry field with data, the computer program product comprising a computer readable storage medium having program instructions embodied therewith, the program instructions executable by a processing unit to cause the processing unit to perform a method comprising:
    identifying a data entry field of a target application;
    identifying a context associated with the data entry field of the target application;
    obtaining a dataset from one or more source applications;
    analyzing the dataset based on the identified data entry field and the context associated with the data entry field to identify a plurality of data items for the data entry field;
    for each data item of the plurality of data items, comparing the data item with an input parameter of the data entry field and the context associated with the data entry field to determine a matching value and confidence value for the data item, wherein the input parameter is a usage rate of each data item;
    providing at least one data item of the plurality of data items to the target application for populating the data entry field based, at least in part, on the matching value for the data item; and
    prioritizing the at least one data item of the plurality of data items most recently acquired by the one or more source applications based on the time representative.

11. The computer program product of claim 10, further comprising at least one processor, wherein the at least one processor is adapted to execute computer program code of the computer program product.

12. A computer system for populating a data entry field with data, comprising:
    one or more computer processors;
    one or more computer readable storage media; and
    computer program instructions, the computer program instructions being stored on the one or more computer readable storage media for execution by the one or more computer processors, the computer program instructions including instructions to:
        identify a data entry field of a target application of a computing device and to identify a context associated with the data entry field of the target application;

obtaining a dataset from one or more source applications;

analyzing the dataset based on the identified data entry field and the context associated with the data entry field to identify a plurality of data items for the data entry field;

for each data item of the plurality of data items, comparing the data item with an input parameter of the data entry field and the context associated with the data entry field to determine a matching value and confidence value for the data item, wherein the input parameter is a usage rate of each data item;

provide at least one data item of the plurality of data items to the target application for populating the data entry field based, at least in part, on the matching value for the data item; and prioritize the at least one data item of the plurality of data items most recently acquired by the one or more source applications based on the time representative.

13. The computer system of claim 12, wherein the confidence value represents a measure of confidence in the data item matching the input parameter and the context associated with of the data entry field.

14. The computer system of claim 12, further comprising instructions to detect a notification from the target application, the notification indicating the presence of a data entry field for population.

15. The computer system of claim 12, further comprising instructions to process communications from the target application to detect the presence of an identifier of a data entry field.

16. The computer system of claim 12, further comprising instructions to process the communications from the target application using natural language processing, NLP.

17. The computer system of claim 12, further comprising instructions to:
  receive a communication from a source application;
  process the received communication using NLP to extract a data item; and
  add the extracted data item to a collection of data items so as generate a dataset.

18. The computer system of claim 12, further comprising instructions to:
  communicate a request to a source application;
  receive, from the source application, a response to the request, wherein the response comprises data from the source application;
  process the data from the source application with a data extraction algorithm to extract a data item; and
  add the extracted data item to a collection of data items so as generate a dataset.

* * * * *